(12) United States Patent
Kustas et al.

(10) Patent No.: US 6,585,193 B1
(45) Date of Patent: Jul. 1, 2003

(54) SPACECRAFT WITH INTEGRATED PULSED-PLASMA THRUSTERS

(75) Inventors: Frank M. Kustas, Parker, CO (US); David M. Barnett, Littleton, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/949,681

(22) Filed: Sep. 10, 2001

Related U.S. Application Data

(60) Provisional application No. 60/244,406, filed on Oct. 30, 2000.

(51) Int. Cl.$^7$ .............................. B64G 1/26; B64G 1/10
(52) U.S. Cl. ..................... 244/169; 244/158 R
(58) Field of Search .............................. 244/158 R, 172, 244/173, 169, 170

(56) References Cited

U.S. PATENT DOCUMENTS

| | | | |
|---|---|---|---|
| 3,405,886 A | * 10/1968 | Gosnell et al. ......... | 244/158 R |
| 4,728,061 A | 3/1988 | Johnson et al. ............. | 244/164 |
| 4,747,567 A | 5/1988 | Johnson et al. ............. | 244/173 |
| 5,044,579 A | * 9/1991 | Bernasconi et al. .... | 244/158 R |
| 5,527,001 A | 6/1996 | Stuart ..................... | 244/158 R |
| 5,924,278 A | 7/1999 | Burton et al. .............. | 60/203.1 |
| 5,963,166 A | 10/1999 | Kamel ................... | 342/357.01 |

FOREIGN PATENT DOCUMENTS

| GB | 1176184 B | * 1/1970 | ................. 244/173 |
|---|---|---|---|

* cited by examiner

*Primary Examiner*—Robert P. Swiatek
(74) *Attorney, Agent, or Firm*—Marsh Fischmann & Breyfogle LLP

(57) ABSTRACT

Various ways of integrating pulsed plasma thrusters with a spacecraft. In one embodiment, pulsed plasma thrusters are mounted on inflatable struts/booms. In another embodiment, pulsed plasma thrusters are mounted within a recess formed on an exterior surface of the spacecraft body.

21 Claims, 6 Drawing Sheets

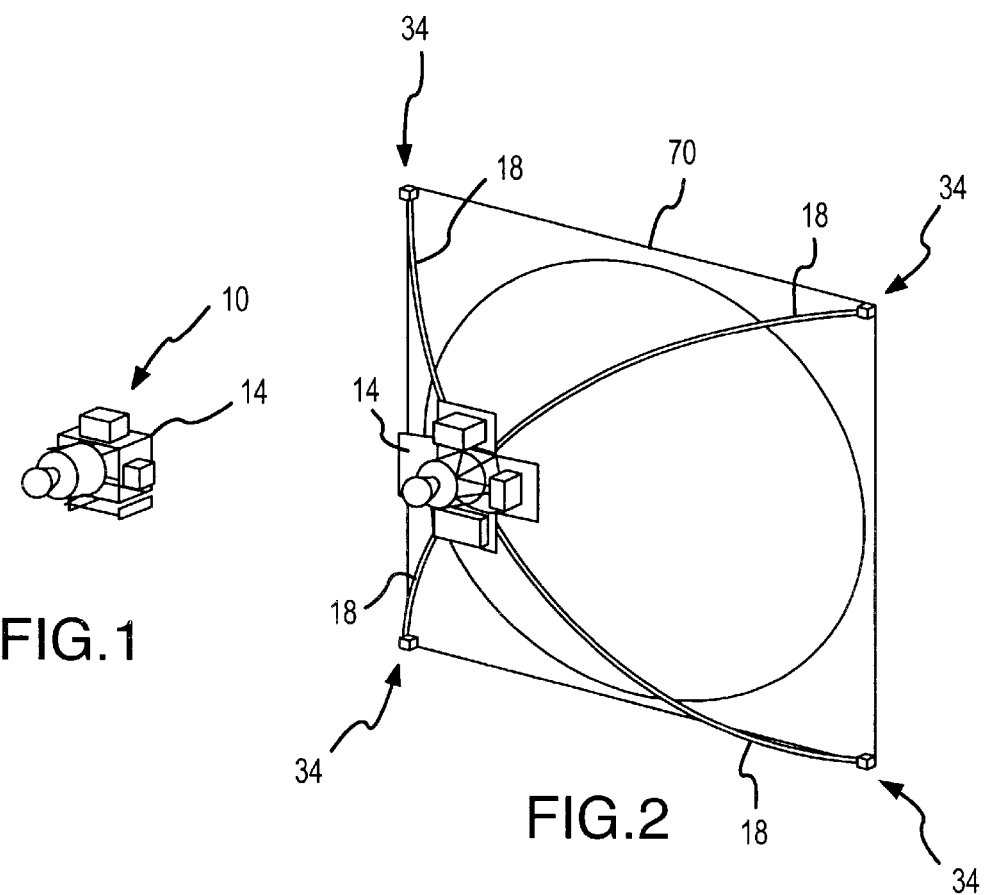

SPACECRAFT WITH INTEGRATED PULSED-PLASMA THRUSTERS

RELATED APPLICATIONS

This patent application claims priority from U.S. Provisional Patent Application Serial No. 60/244,406, filed on Oct. 30, 2000, and entitled "SPACECRAFT WITH INTEGRATED PULSED-PLASMA THRUSTERS," the entire disclosure of which is incorporated by reference in its entirety herein.

FIELD OF THE INVENTION

The present invention generally relates to the field of spacecraft that use pulsed plasma thrusters and, more particularly, to how pulsed plasma thrusters are incorporated with the spacecraft.

BACKGROUND OF THE INVENTION

Pulsed plasma thrusters are known in the spacecraft art and have in fact been flown on missions into outer space. One function of pulsed plasma thrusters is for fine positioning attitude control of spacecraft. These types of pulsed plasma thrusters in the past have been "bolt-on" type units that are separately attached to the exterior body of the spacecraft.

BRIEF SUMMARY OF THE INVENTION

The present invention generally relates to how pulsed plasma thrusters may be incorporated with a spacecraft. In a first aspect of the present invention, a spacecraft includes a spacecraft body, a first pulsed plasma thruster (although more than one pulsed plasma thruster may and typically will be utilized), and a first inflatable member that is also interconnected with the body of the spacecraft. Representative examples of the first inflatable member include an inflatable boom or strut. The first inflatable member will typically be stored within the spacecraft body, and typically an appropriate fluid will be directed within the first inflatable member to move the same from its stowed position to its fully deployed position. One way of interconnecting the first inflatable member is by having one end of the first inflatable member be interconnected in some manner with the body of the spacecraft such that its second end it will be spaced from the spacecraft body when the first inflatable member is deployed. The first inflatable member also includes a first rigid support structure such as a cap or the like. The first pulsed plasma thruster (and possibly other pulsed plasma thrusters) is disposed at this first rigid support structure.

Various refinements exist of the features noted in relation to the subject first aspect of the present invention. Further features may also be incorporated in the subject first aspect of the present invention as well. These refinements and additional features may exist individually or in any combination. The length of the first rigid support structure may be significantly less than the length of the body of the first inflatable member when deployed. In one embodiment, the ratio of the length of the first rigid support structure to the total length of the first inflatable member when deployed is no more than about 1%. The first rigid support structure with its first pulsed plasma thruster also may be incorporated with the first inflatable member at a variety of locations. In one embodiment, the first rigid support structure is disposed at least substantially at the second or distal end of the first inflatable member, such that the first rigid support structure may be characterized as a first end cap or the like. As such, the first rigid support structure would be disposed in spaced relation to the spacecraft body by a membrane or the like which defines the body of the first inflatable member. Another option would be to dispose the first rigid support structure at some intermediate location between the two extreme ends of the first inflatable member. In this case, a portion of a membrane or the like which defines the body of the first inflatable member would be disposed on both sides of the first rigid support structure. It may also be desirable to include a plurality of first rigid support structures that are spaced along the length of the first inflatable member. One or more pulsed plasma thrusters may be disposed on any number of these first rigid support structures.

A plurality of pulsed plasma thrusters may be interconnected with the first rigid support structure that is interconnected with the first inflatable member. One of these pulsed plasma thrusters may be oriented on the first rigid support structure so as to direct thrust therefrom in a first direction. Another of these pulsed plasma thrusters may be oriented on the first rigid support structure so as to direct its thrust in a second direction which differs from the first direction. Any number and/or orientation of pulsed plasma thrusters may be disposed on the first rigid support structure, subject of course to the size of the first rigid support structure accommodating the desired number of pulsed plasma thrusters.

The subject first aspect may also include a second inflatable member that is similarly configured to the first inflatable member described above. Typically the spacecraft of the subject first aspect will include at least three inflatable members of the type described above in relation to the first inflatable member. These plurality of inflatable members may be utilized to deploy a membrane which may provide any number of a variety of functions. For instance, the membrane may be utilized to deploy a one or more solar panels, one or more photovoltaic cells or cell arrays, one or more antenna apertures, one or more solar sail membranes, or one or more occulting membrane. Typically, these membranes will have a surface area of at least about 2,500 m$^2$ in one in embodiment, and about 4,900 m$^2$ in another embodiment.

Spacecraft bus power may be utilized to operate or "fire" the first pulsed plasma thruster at the desired/required time. The spacecraft bus would typically be located at the body of the spacecraft. A number of options may be employed in relation to how this power is delivered from the spacecraft bus to the pulsed plasma thruster(s) disposed on the first rigid support structure. One option would be to provide a high voltage power supply, a high voltage storage capacitor, and controller for each pulsed plasma thruster that is disposed on the first rigid support structure associated with the first inflatable member. The high voltage power supply, high voltage storage capacitor, and controller all may be disposed on the first rigid support structure associated with the first inflatable member. A series connection of the above-noted components and in the above-noted order may be utilized, with the spacecraft bus and the high voltage power supply being interconnected by a flexible circuit which extends between the spacecraft bus and the first rigid support structure along the inflatable member in some manner for electrical interconnection with each of the high voltage power supplies at the first rigid support structure This flexible circuit may be attached to a membrane which defines the body of the first inflatable member, or alternatively may extend along the first inflatable member within its hollow interior after the first inflatable member has been inflated/expanded.

Another option for providing power from the spacecraft bus to the plasma pulsed thruster(s) that are disposed on the first rigid support structure associated with the first inflatable member is to dispose a high voltage power supply at the body of the spacecraft and to electrically interconnect the same with the spacecraft bus. A high voltage storage capacitor and controller may be provided for each pulsed plasma thruster that is disposed on the first rigid support structure. The high voltage storage capacitor and controller of each pulsed plasma thruster that is disposed on the first rigid support structure may be located at the first rigid support structure as well, may be connected in series in the above-noted order, and further may be electrically interconnected with the high voltage power supply by the above-noted type of flexible circuit which would then extend between the high voltage power supply and the first rigid support structure, where appropriate electrical connections could then be made with each of the pulsed plasma thrusters disposed on the first rigid support structure through the noted components.

Yet another option which may be employed for delivering power from the spacecraft bus to the pulsed plasma thruster (s) disposed on the first rigid support structure of the first inflatable member is to dispose a single low voltage storage device at the first rigid support structure and to electrically interconnect the same with the spacecraft bus by the above-noted type of flexible circuit. This single low voltage storage device may direct power to a separate high voltage power supply, high voltage storage capacitor, and controller for each pulsed plasma thruster that is disposed on the first rigid support structure associated with the first inflatable member. The high voltage power supply, high voltage storage capacitor, and controller of each pulsed plasma thruster all may be disposed on the first rigid structure and may be interconnected in series in the noted order.

A second aspect of the present invention is directed to a spacecraft which includes a spacecraft body. An exterior surface of this spacecraft body may be defined as a first surface. A first recess is disposed on this first surface, and a first pulsed plasma thruster is disposed within this first recess and is appropriately interconnected with the spacecraft body.

Various refinements exist of the features noted in relation to the subject second aspect of the present invention. Further features may also be incorporated in the subject second aspect of the present invention as well. These refinements and additional features may exist individually or in any combination. One advantage which may be realized by the subject second aspect of the present invention is that incorporating pulsed plasma thrusters on the spacecraft body need not necessarily increase the amount of space that is taken up by the spacecraft body. In this regard and in one embodiment, preferably no portion of any pulsed plasma thruster disposed within the first recess associated with the second aspect extends beyond those portions of the first surface of the spacecraft body which are disposed about the perimeter of the first recess. Stated another way, preferably the height of any pulsed plasma thruster disposed within the first recess is no more than the depth of the first recess.

The spacecraft body of the second aspect may be defined by a plurality of rigid panels that are appropriately interconnected. Each of these panels may include first and second sheets with a core disposed therebetween. In this case the first sheet corresponds with the first surface of the spacecraft body (i.e., the first sheet is on the exterior of the spacecraft). This core may be a honeycomb structure or an appropriate foam.

The spacecraft of the second aspect may be what is characterized as a nano-satellite. Typically, the body of a nano-satellite is no more than about 2 $m^2$ in size. Nano-satellites will commonly use the above-noted type construction of first and second sheets with a core disposed therebetween.

Multiple pulsed plasma thrusters may be disposed in the first recess on the exterior surface of the spacecraft body. All or at least part of the pulsed plasma thruster(s) may be disposed in this first recess. At least the plasma-producing material of the pulsed plasma thruster(s) will be disposed within the first recess. Multiple first recesses may be disposed on the spacecraft body in spaced relation, and may include one or more pulsed plasma thrusters in the manner discussed herein.

BRIEF DESCRIPTION OF THE SEVERAL VIEWS OF THE DRAWING

FIG. 1 is one embodiment of a spacecraft with inflatable struts that are stored within a strut canister.

FIG. 2 is a perspective view of the spacecraft of FIG. 1 in the deployed position and which generally shows pulsed plasma thrusters on the distal ends of the inflated struts.

DETAILED DESCRIPTION OF THE INVENTION

Figure 3B:
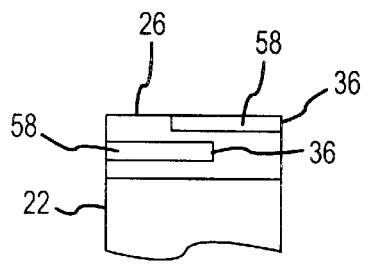
FIG. 3B is an enlarged view of an end cap on the top strut of FIG. 3A and which includes a one arrangement of plasma-producing material for a number of pulsed plasma thrusters that are disposed on the end cap.

The present invention will now be described in relation to the accompanying drawings which at least assist in illustrating its various pertinent features. FIGS. 1–4 illustrate one embodiment of a spacecraft 10 and components thereof. The spacecraft 10 generally includes a strut canister 14. A plurality of inflatable struts 18 and a deployable membrane 70 are stored within the strut canister 14 until deployment of the membrane 70 is desired. The membrane 70 may be utilized for sunlight blocking, solar sailing, power generation, and communications. In one embodiment, the membrane 70 is in the form of a thin film with thereby only two primary surfaces, each of which has surface area of at least 2,500 m².

Any number of inflatable struts 18 may be utilized so long as the membrane 70 may be appropriately deployed thereby (i.e., the membrane 70 is interconnected with each of the struts 18, typically at a distal location on the struts 18). Each strut 18 generally includes a strut membrane 22 which defines the body (e.g., cylindrical) of the strut 18 when inflated/expanded, and which has a pair of oppositely disposed ends in the deployed condition. One end of each strut membrane 22 is typically fixed to the strut canister 14, although the same could be fixed to the body of the spacecraft 10 as well. Disposed on the distal end of each strut membrane 22 is a rigid end cap 26 that is appropriately secured to the distal end portion of its corresponding strut membrane 22. Typically the membrane 70 will be attached to the rigid end cap 26 of each strut 18 as well. When deployment of the membrane 70 is desired, the strut canister 14 is opened (FIG. 2) and an appropriate fluid (e.g., cold gas, such as gaseous nitrogen) is directed into each of the struts 18 such that the same becomes effectively rigid in a manner that is known in the art.

In one embodiment, each of the inflatable struts 18 will have a length or longitudinal extent of at least about 35 m, and a diameter of each strut 18 is at least about 0.5 m when deployed. The length of the strut membrane 22 of each strut 18 is also typically significantly more than the length of its corresponding rigid end cap 26. In one embodiment, the length of the rigid end cap (measured parallel with the longitudinal extent of the struts 18 when deployed), is no more than about 2.25 inches, and in another embodiment is about 4.5 inches.

Figure 3A:
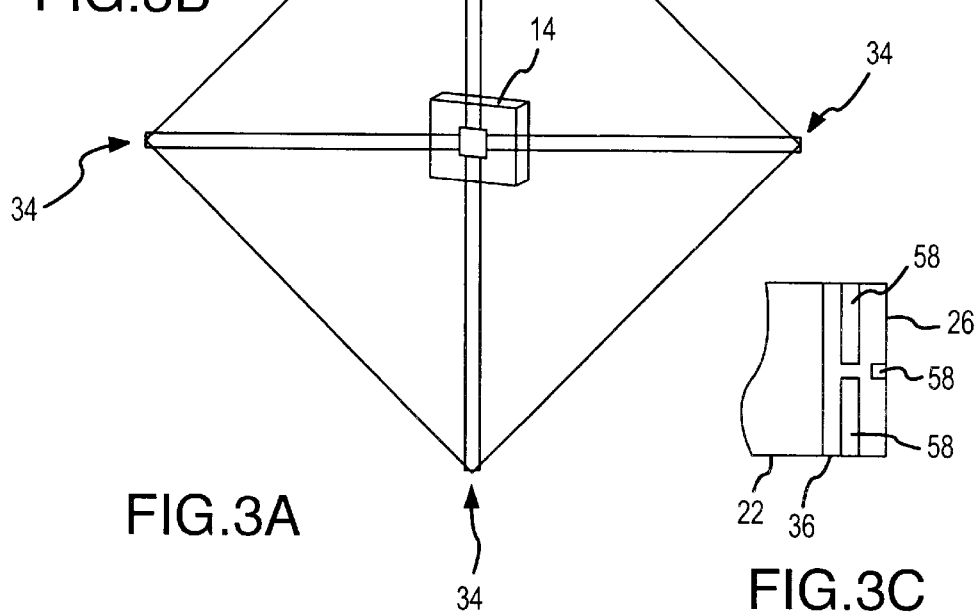
FIG. 3A is a schematic, plan view of the spacecraft of FIG. 2.
Figure 3C:
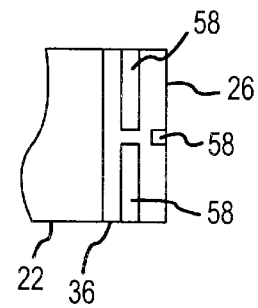
FIG. 3C is an enlarged view of an end cap on the right strut of FIG. 3A and which includes another arrangement of plasma-producing material for a number of pulsed plasma thrusters that are disposed on the end cap.
Figure 4:
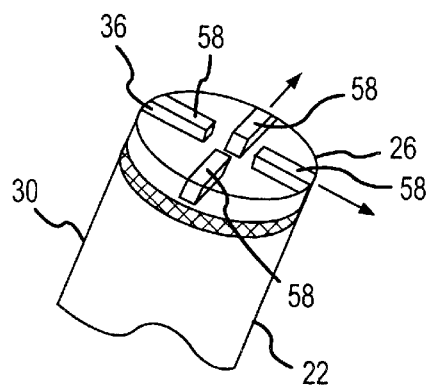
FIG. 4 is a perspective view of another arrangement of plasma-producing material for a number of pulsed plasma thrusters that may be disposed on an end cap of one of the inflatable struts of FIG. 2.

Each inflatable strut 18 includes a pulsed plasma thruster assembly 34 that in turn includes at least one individual pulsed plasma thruster 36. These pulsed plasma thruster assemblies 34 will typically be used for fine positioning attitude control of the spacecraft 10 through thrust that is generated by plasma that is generated from a plasma-producing material 58 (e.g., Teflon rods/bars) from one or more pulsed plasma thrusters 36. FIGS. 2–4 illustrate that the pulsed plasma thruster assemblies 34 are disposed on an end portion of each of the inflatable struts 18. One way to structurally integrate the pulsed plasma thruster assemblies 34 with the distal end of the inflatable struts 18 is by disposing the same within their respective end cap 26. In the illustrated embodiment, the end caps 26 are at least generally cup-shaped such that no portion of the pulsed plasma thruster(s) 34 disposed therein extends beyond the end of the rigid end cap 26.

Other locations for the pulsed plasma thruster assemblies 34 could be utilized as well. For instance, one or more pulsed plasma thruster assemblies 34 could be mounted on one or more of the inflatable struts 18 somewhere between the its two extreme ends (not shown). In this case, a rigid cap or the like could be disposed at such an intermediate location along the length of the desired inflatable strut(s) 18 for purposes of housing one of the pulsed plasma thruster assemblies 34 (not shown). In one embodiment, such an intermediate cap would be similar in size and configuration to the end caps 26 discussed herein. As such, portions of the strut membrane 22 would be disposed on each side of such an intermediate cap.

Figure 5:
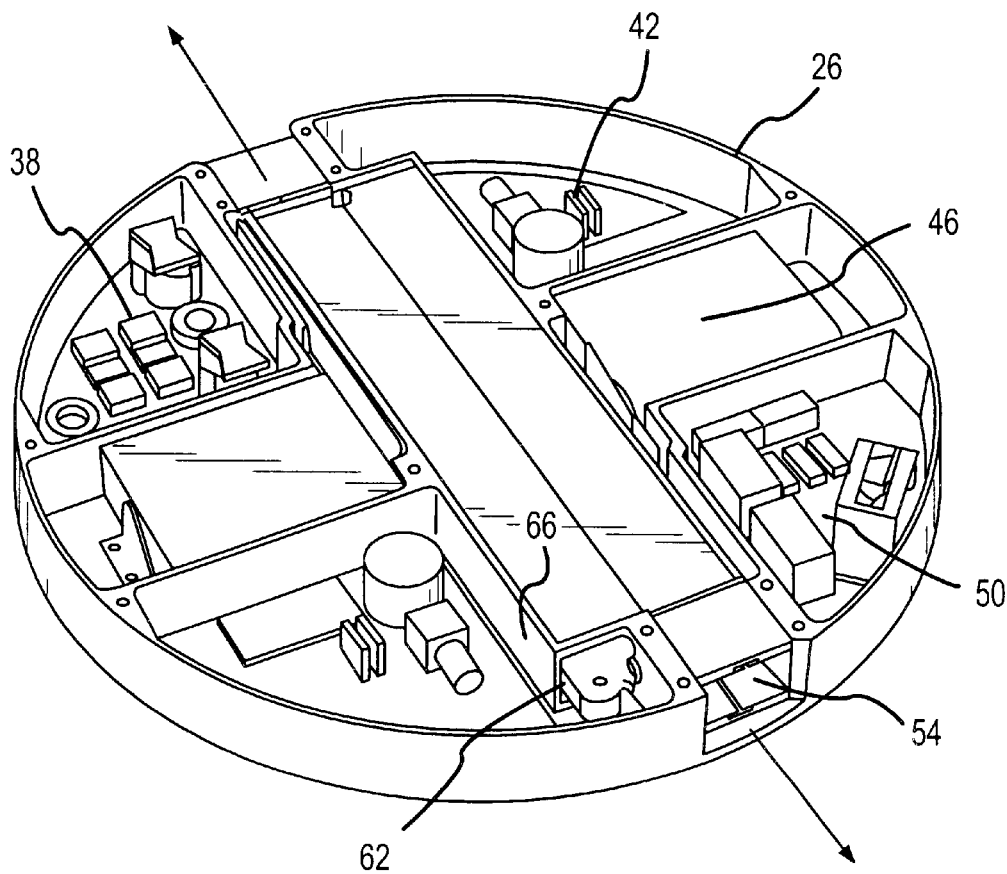
FIG. 5 is a perspective view of one embodiment of a pair of pulsed plasma thrusters disposed on an end cap of the type which may be utilized on the inflatable struts of FIGS. 2–3C.

Thrust is generated by plasma produced from the plasma-producing material 58 of the desired/required pulsed plasma thruster 36. One arrangement of electrical elements that that be utilized to accomplish plasma generation in this manner is illustrated in FIG. 5, and includes DC—DC converter electronics 38, discharge initiation circuits 42, MICA capacitors 46, and input/EMI filter 50. These components operatively interconnect with each of the pulsed plasma thrusters 36 (or may be considered as part of the same) and are also disposed on their respective end cap 26. The plasma-producing material 58 is disposed within an appropriate plasma-producing material housing 66. Power is delivered by the noted electrical components to an electrode pair 54 of the desired pulsed plasma thruster 36 to initiate/maintain the generation of plasma from the plasma-producing material 58, which in turn generates thrust in a direction which is at least generally radially away from the longitudinal extent of the struts 18 (e.g., in the direction of the arrows in FIGS. 4 and 5). It should be appreciated that any orientation may be utilized for the plasma-producing material 58 of each individual pulsed plasma thruster 36 so as to generate thrust from the plasma generated from this plasma-producing material 58 in the desired direction. Moreover, it should be appreciated that any number of pulsed plasma thrusters 36 may be utilized by each of the pulsed plasma thruster assemblies 34 (e.g., one or more). More than one pulsed plasma thruster 36 of a given pulsed plasma thruster assembly 34 could be activated at any given time to produce a combinative thrust on the corresponding inflatable strut 18. Pulsed plasma thrusters are known in the art, although the same have not been integrated with spacecraft in the manner described herein. Reference may be made to U.S. Pat. No. 5,924,278 in this regard. Therefore, it is not necessary to describe the structure and operation of the individual pulsed plasma thrusters 36 in greater detail herein. What is of importance in relation to the subject invention is the placement of the pulsed plasma thrusters on the spacecraft and how/where these pulsed plasma thrusters are interconnected with the spacecraft.

Figure 6A:
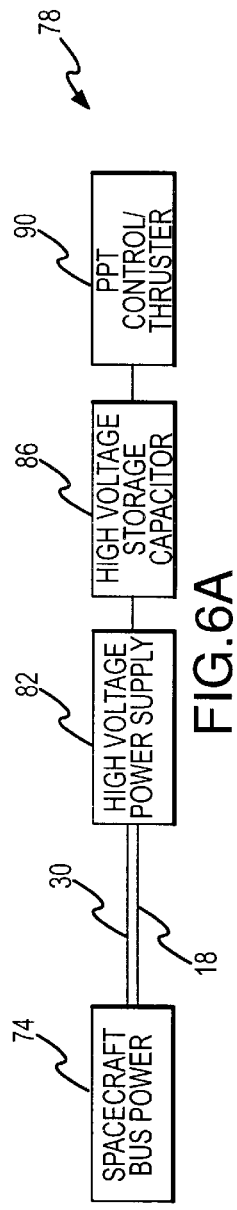
FIG. 6A is one embodiment of a pulsed plasma thruster power supply system for use with pulsed plasma thrusters that are incorporated on inflatable struts of a spacecraft.
Figure 6B:
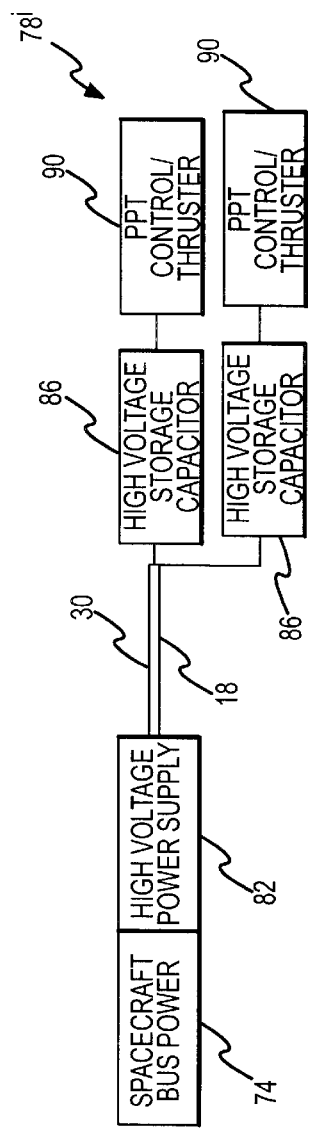
FIG. 6B is another embodiment of a pulsed plasma thruster power supply system for use with pulsed plasma thrusters that are incorporated on inflatable struts of a spacecraft.
Figure 6C:
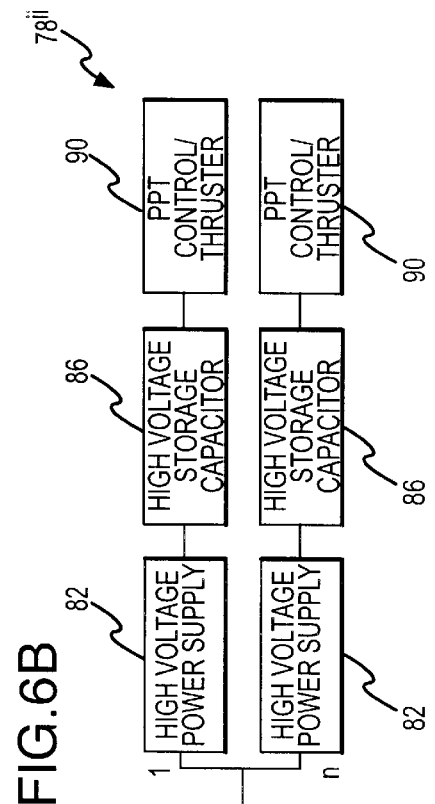
FIG. 6C is another embodiment of a pulsed plasma thruster power supply system for use with pulsed plasma thrusters that are incorporated on inflatable struts of a spacecraft.

A number of ways of delivering power from a spacecraft bus 74 to the pulsed plasma thrusters 36 of a given pulsed plasma thruster assembly 34 are presented in FIGS. 6A–C. Initially, the source for each of these cases is the spacecraft bus 74 that is disposed somewhere on/within the body 12 of the spacecraft 10 (i.e., inwardly of the deployed struts 18). The spacecraft bus 74 in turn may be provided or charged by solar panels, photovoltaic cells, or the like (not shown). In any case, power from the spacecraft bus 74 is deliverable to each of the pulsed plasma thruster assemblies 34 by a flexible circuit 30 which runs along the entire length of the strut membrane 22 of the subject strut 18. This flexible circuit 30 could be disposed in interfacing relation with the strut membrane 22 and appropriately secured thereto, or could run along the hollow interior of strut 18 when deployed.

FIG. 6A illustrates one embodiment of a pulsed plasma thruster power supply system 78 in which all of its components are disposed at the end cap 26 of the subject pulsed plasma thruster assembly 34. Components of the pulsed plasma thruster power supply system 78 include a separate high voltage power supply 82, high voltage storage capacitor 86, and pulsed plasma thruster controller 90 for each pulsed plasma thruster 36 utilized by the subject pulsed plasma thruster assembly 34. The high voltage power supply 82, high voltage storage capacitor 86, pulsed plasma thruster controller 90 and corresponding pulsed plasma thruster 36 are electrically interconnected in series in this order. Therefore, the flexible circuit 30 would extend out to the rigid end cap 26 to establish electrical interconnection with each of the high voltage power supplies 82 disposed on such an end cap 26.

Another option for delivering power is presented in FIG. 6B in the form of a pulsed plasma thruster power supply system 78$^i$. Generally, the pulsed plasma thruster power supply system 78$^i$ of FIG. 6B disposes the high voltage power supply 82 at the body 12 of the spacecraft 10 versus at the distal end of each of the inflatable struts 18 as is the case with FIG. 6A embodiment. Each pulsed plasma thruster assembly 34 may also have its own such high voltage power supply 82. In the FIG. 6B configuration, the high voltage power supply 82 is electrically interconnected with each pulsed plasma thruster 36 of the corresponding pulsed plasma thruster assembly 34 (i.e., one high voltage power supply 82 services all pulsed plasma thrusters 36 of a given pulsed plasma thruster assembly 34). Contrast this with the FIG. 6A variation in which each pulsed plasma thruster 36 has its own high voltage power supply 82. The pulsed plasma thruster power supply system 78$^i$ of FIG. 6B has a separate high voltage storage capacitor 86 and pulsed plasma thrust controller 90 for each pulsed plasma thruster 36 of a given pulsed plasma thruster assembly 34. The high voltage storage capacitor 86, pulsed plasma thruster controller 90, and corresponding pulsed plasma thruster 36 are electrically interconnected in series in this order. The high voltage storage capacitor 86 and pulsed plasma thrust controller 90 of each pulsed plasma thruster 36 are also preferably disposed at the corresponding end cap 26. Therefore, the flexible circuit 30 would extend out to the rigid end cap 26 to establish electrical interconnection with each of the high voltage storage capacitors 86 disposed on such an end cap 26.

Yet another option is presented in FIG. 6C in the form of a pulsed plasma thruster power supply system 78$^{ii}$. Generally, the pulsed plasma thruster power supply system 78$^{ii}$ of FIG. 6C disposes all components at the distal end of each of the inflatable struts 18 as in the case of the FIG. 6A embodiment, preferably at the corresponding end cap 26. However, there are distinctions from the FIG. 6A arrangement. For instance, power from the spacecraft bus 74 is initially directed to a low voltage storage device 94 (e.g., a battery, capacitor). This single low voltage storage device 94 directs power to each of the pulsed plasma thrusters 36 of the subject pulsed plasma thruster assembly 34 through its own high voltage power supply 82, a high voltage storage capacitor 86, and a pulsed plasma thruster controller 90 (i.e., each pulsed plasma thruster 36 has its own high voltage power supply 82, high voltage storage capacitor 86, and pulsed plasma thruster controller 90). The high voltage power supply 82, high voltage storage capacitor 86, pulsed plasma thruster controller 90, and corresponding pulsed plasma thruster 36 are electrically interconnected in series in this order. Each "set" of high voltage power supplies 82, high voltage storage capacitors 86, and pulsed plasma thrust controller 90 of each pulsed plasma thruster 36, as well as the low voltage storage device 94, are also preferably disposed at the corresponding end cap 26. Therefore, the flexible circuit 30 would extend out to the rigid end cap 26 to establish electrical interconnection with the low voltage storage device 94 at the subject end cap 26.

It should be appreciated that pulsed plasma thrusters may be integrated with inflatable struts of configurations other than those presented herein and still be in accordance with one or more principles of the present invention. Moreover, inflatable struts with integrated pulsed plasma thrusters may be used on configurations of spacecraft other than those presented herein and still be in accordance with one or more principles of the present invention.

Figure 7:
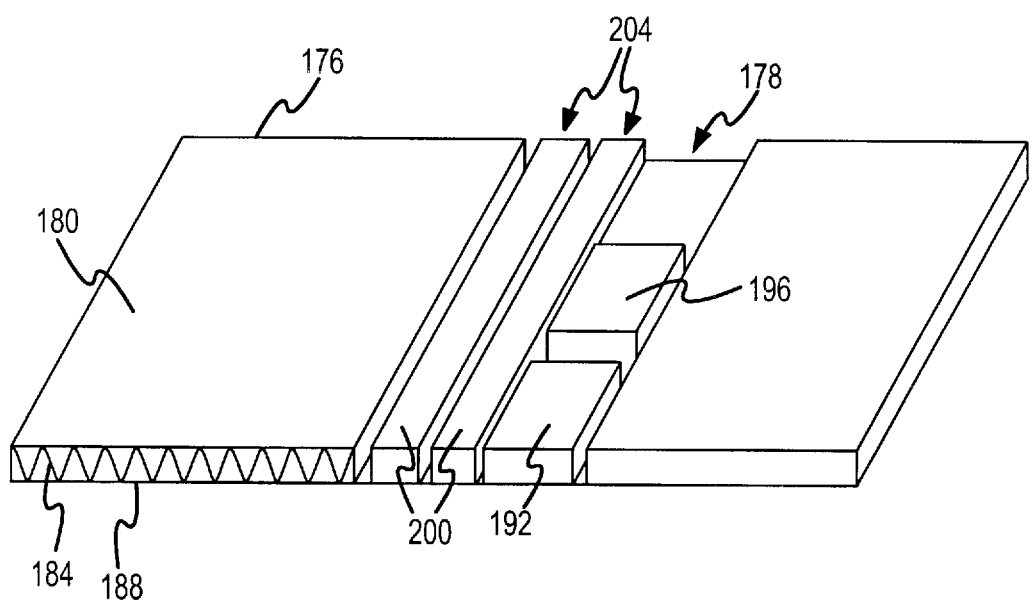
FIG. 7 is one embodiment of a pair of pulsed plasma thrusters that are disposed within a recess formed on an exterior surface of a spacecraft body.

Certain spacecraft may not utilize inflatable struts or booms of the type described herein. Other spacecraft may include some type of inflatable strut/boom, but it may not be desirable to integrate pulsed plasma thrusters into the structure of such struts/booms for one reason or another. Another option for structurally integrating pulsed plasma thrusters with spacecraft is illustrated in FIG. 7 and does not require inflatable struts for purposes of "mounting" pulsed plasma thrusters. Generally, the pulsed plasma thrusters are structurally integrated with the body of the spacecraft within a recess formed on an exterior surface thereof. FIG. 7 depicts a rigid spacecraft panel 176 that is part of the structure of the body of a spacecraft. The spacecraft panel 176 generally includes a face sheet 180 and a bottom sheet 188 with a honeycomb core 184 disposed therebetween. The face sheet 180, bottom sheet 188, and honeycomb core 184 are appropriately interconnected to provide a desired degree of rigidity for the body of the spacecraft, with the face sheet 180 defining an exterior surface of the spacecraft. Other types of cores could be utilized as well within the panels 176, such as foam. However, preferably, the rigidity of panels 176 for spacecraft is at least comparable with structural aluminum allows (e.g., 6 GPa modulus).

Two pulsed plasma thrusters 200 are disposed in a cut-out, recessed region 178 of the spacecraft panel 176. Ablation/ionization of the plasma-producing material 204 which is utilized by each of these pulsed plasma thrusters 200 generates a thrust, and this ablation/ionization may be focused in a direction so as to generate the thrust in the desired direction. Components of the pulsed plasma thrusters 200 which initiate/maintain plasma generation from the material 204 may be disposed in this cut-out region 178 of the spacecraft panel 176 as well, such as one or more storage capacitors 192 and one or more power supplies 196. Notably, no portion of the pulsed plasma thrusters 200 extends beyond the face sheet 180 of the spacecraft panel 176. That is, all portions of the pulsed plasma thrusters 200 are either disposed in co-planar relation with the face sheet 180 or are recessed relative to the face sheet 180 (i.e., spaced from the face sheet 180 in the direction of the bottom sheet 188). Stated another way, all portions of any pulsed plasma thrusters 200 disposed within the recess 178, as well as any "components" used by such pulsed plasma thrusters for that matter, preferably have a height which is no more than the depth of the recess 178. This type of installation for pulsed plasma thrusters may be utilized on spacecraft bodies which are not formed from interconnected panels 176 as well.

Figure 8A:
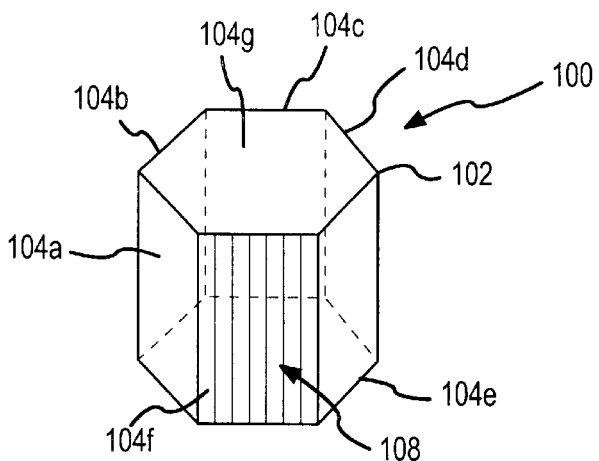
FIG. 8A is one embodiment of a nano-satellite that may incorporate pulsed plasma thrusters in at least the general manner presented in FIG. 7.
Figure 8C:
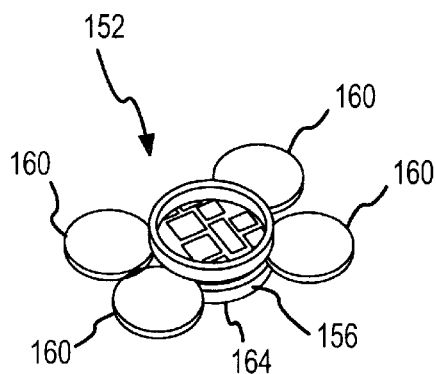
FIG. 8C is one embodiment of a nano-satellite that may incorporate pulsed plasma thrusters in at least the general manner presented in FIG. 7.
Figure 8B:
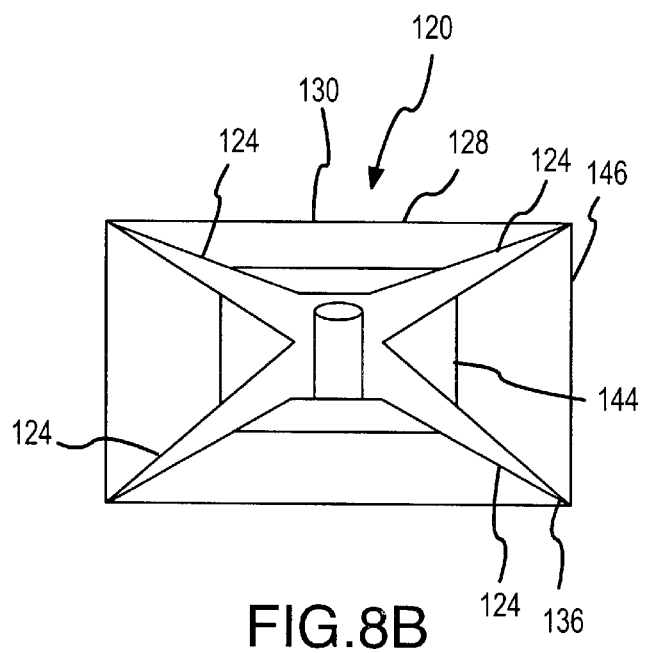
FIG. 8B is another embodiment of a nano-satellite that may incorporate pulsed plasma thrusters in at least the general manner presented in FIG. 7.

Panels 176 are commonly used to define the body of nano-satellites. Nano-satellites may be characterized by being of a size of no more than about 2 m$^2$, as well as having one or more of the following features: a structural frame, solar array panels, guidance, navigation, and control systems (GN&C), communication systems, and sensors. Representative nano-satellites are illustrated in FIGS. 8A–C, and may include pulsed plasma thrusters into the structure thereof at least in the general manner presented in FIG. 7. FIG. 8A presents a nano-satellite 100 that includes a body 102 that is defined by a plurality of faces 104. These faces 104 define an exterior surface of the body 102 of the nano-satellite 100. Each of the faces 104 may be defined by the type of spacecraft panels 176 presented in FIG. 7. The faces 104 may be used for a variety of purposes. For instance, face 104c, 104f, and 104g each may include a body-mounted photovoltaic cell array (illustrated only on face 104f). Moreover faces 104a, 104b, 104d, and 104e may include one or more pulsed plasma thrusters 200 in the manner presented in FIG. 7.

FIG. 8B presents a nano-satellite 120 that includes a central body 128 and a plurality of inflatable struts 124 that are initially stored within this central body 128. Deployment of the struts 124 is used to deploy a membrane 140. This membrane 140 may include a flexible solar array panel 144. The inflatable struts 124 may be used for other purposes as well, such as for deploying a GPS patch antenna 138 that is attached at least toward the distal end of one of the struts 124. The central body 128 in this case is at least generally cylindrical. One or more pulsed plasma thrusters may be incorporated on the cylindrical sidewall of this central body 128 in at least the general manner presented by the spacecraft panel 176 of FIG. 7, such as at the region encompassed by the reference circle 130. Obviously, the face sheet 180 of the spacecraft panel 176 in this case would assume a cylindrical profile versus the flat profile that is presented in FIG. 7.

FIG. 8C presents a nano-satellite 152 that includes a central body 156 that is of an at least generally cylindrical shape. A plurality of circular solar panels or photovoltaic cells 160 are initially stored within the central body 156. When deployment is desired, the panels/cells 160 are at least generally pivoted outwardly away from the central body 156 into the position illustrated in FIG. 8C. One or more pulsed plasma thrusters may be incorporated on the cylindrical sidewall of this central body 156 in at least the general manner presented by the spacecraft panel 176 of FIG. 7, such as at the location encompassed by the lead line 164. Obviously, the face sheet 180 of the spacecraft panel 176 in this case would assume a cylindrical profile versus the flat profile that is presented in FIG. 7.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A spacecraft, comprising:
a spacecraft body;
a first pulsed plasma thruster; and
a first inflatable member which is interconnected with said spacecraft body, which is movable at least from a first stowed position to a first deployed position, and which comprises first and second ends, wherein said first end of said first inflatable member is interconnected with said spacecraft body, wherein said second end of said first inflatable member is disposed in spaced relation to said spacecraft body when said first inflatable member is in said first deployed position, wherein said first inflatable member comprises a first cap that is specific to said first inflatable member in that said first cap is not associated with any other inflatable member, wherein said first cap is a rigid support structure, and wherein said first pulsed plasma thruster is attached to said first cap of said first inflatable member.

2. A spacecraft, as claimed in claim 1, wherein:
said first cap of said first inflatable member is disposed at least substantially at said second end of said first inflatable member.

3. A spacecraft, as claimed in claim 1, further comprising:
a second pulsed plasma thruster which is interconnected with said first cap of said first inflatable member.

4. A spacecraft, as claimed in claim 3, wherein:
said first pulsed plasma thruster is disposed to direct thrust in a first direction and said second pulsed plasma thruster is disposed to direct thrust in a second direction which is different than said first direction.

5. A spacecraft, as claimed in claim 1, further comprising:
a second inflatable member which is interconnected with said spacecraft body, which is movable at least from a second stowed position to a second deployed position, and which comprises first and second ends, wherein said first end of said second inflatable member is interconnected with said spacecraft body, wherein said second end of said second inflatable member is disposed in spaced relation to said spacecraft body when said second inflatable member is in said second deployed position, wherein said second inflatable member comprises a second cap, wherein said second cap is a rigid support structure, and wherein said spacecraft further comprises a second pulsed plasma thruster which is interconnected with said second cap of said second inflatable member.

6. A spacecraft, as claimed in claim 5, further comprising:
a membrane which is interconnected with each of said first and second inflatable members and which is disposed in spaced relation to said spacecraft body when said first and second inflatable members are disposed in said first and second deployed positions, respectively.

7. A spacecraft, as claimed in claim 6, wherein:
said membrane has a surface area of at least about 2,500 $m^2$.

8. A spacecraft, as claimed in claim 1, wherein:
said first inflatable member is defined by a first flexible material, wherein said first flexible material is wrapped around said first cap when said first inflatable member is in said first stowed position.

9. A spacecraft, as claimed in claim 1, further comprising:
a spacecraft bus disposed at said spacecraft body;
a flexible circuit which is electrically interconnected with said spacecraft bus and which extends along said first inflatable member;
a first high voltage power supply which is disposed at said first cap of said first inflatable member and which is electrically interconnected with said flexible circuit;
a first high voltage storage capacitor which is disposed at said first cap and which is electrically interconnected with said first high voltage power supply;
a first pulsed plasma thruster controller which is disposed at said first cap and which is electrically interconnected with said first high voltage storage capacitor, wherein said first pulsed plasma thruster is electrically interconnected with said first pulsed plasma thruster controller, wherein said first high voltage power supply, said first high voltage storage capacitor, said first pulsed plasma thruster controller, and said first pulsed plasma thruster are connected in series;

a second pulsed plasma thruster which is disposed at said first cap;

a second high voltage power supply which is disposed at said first cap of said first inflatable member and which is electrically interconnected with said flexible circuit;

a second high voltage storage capacitor which is disposed at said first cap and which is electrically interconnected with said second high voltage power supply; and a second pulsed plasma thruster controller which is disposed at said first cap and which is electrically interconnected with said second high voltage storage capacitor, wherein said second pulsed plasma thruster is electrically interconnected with said second pulsed plasma thruster controller, wherein said second high voltage power supply, said second high voltage storage capacitor, said second pulsed plasma thruster controller, and said second pulsed plasma thruster are connected in series.

10. A spacecraft, as claimed in claim 1, further comprising:

a spacecraft bus disposed at said spacecraft body;

a high voltage power supply which is disposed at said spacecraft body;

a flexible circuit which is electrically interconnected with said high voltage power supply and which extends along said first inflatable member;

a first high voltage storage capacitor which is disposed at said first cap and which is electrically interconnected with said flexible circuit; and a first pulsed plasma thruster controller which is disposed at said first cap and which is electrically interconnected with said first high voltage storage capacitor, wherein said first pulsed plasma thruster is electrically interconnected with said first pulsed plasma thruster controller, wherein said high voltage power supply, said first high voltage storage capacitor, said first pulsed plasma thruster controller, and said first pulsed plasma thruster are connected in series and in this order.

11. A spacecraft, as claimed in claim 1, further comprising:

a spacecraft bus disposed at said spacecraft body;

a flexible circuit which is electrically interconnected with said spacecraft bus and which extends along said first inflatable member;

a low voltage storage device which is disposed at said first cap of said first inflatable member and which is electrically interconnected with said flexible circuit;

a first high voltage power supply which is disposed at said first cap of said first inflatable member and which is electrically interconnected with said low voltage storage device;

a first high voltage storage capacitor which is disposed at said first cap and which is electrically interconnected with said first high voltage power supply;

a first pulsed plasma thruster controller which is disposed at said first cap and which is electrically interconnected with said first high voltage storage capacitor, wherein said first pulsed plasma thruster is electrically interconnected with said first pulsed plasma thruster controller, wherein said first high voltage power supply, said first high voltage storage capacitor, said first pulsed plasma thruster controller, and said first pulsed plasma thruster are connected in series;

a second pulsed plasma thruster which is disposed at said first cap;

a second high voltage power supply which is disposed at said first cap of said first inflatable member and which is electrically interconnected with said low voltage storage device;

a second high voltage storage capacitor which is disposed at said first cap and which is electrically interconnected with said second high voltage power supply; and a second pulsed plasma thruster controller which is disposed at said first cap and which is electrically interconnected with said second high voltage storage capacitor, wherein said second pulsed plasma thruster is electrically interconnected with said second pulsed plasma thruster controller, wherein said second high voltage power supply, said second high voltage storage capacitor, said second pulsed plasma thruster controller, and said second pulsed plasma thruster are connected in series.

12. A spacecraft, as claimed in claim 1, wherein:

said first end of said first inflatable member is disposed closer to said spacecraft body than said second end when said first inflatable member is in said first deployed position.

13. A spacecraft, as claimed in claim 1, further comprising:

a plurality of first inflatable members and a plurality of first pulsed plasma thrusters, wherein at least one of said first pulsed plasma thrusters is attached to said first cap of each of said first inflatable members.

14. A spacecraft, comprising:

a spacecraft body;

a first pulsed plasma thruster; and a first inflatable member which is interconnected with said spacecraft body, which is movable at least from a first stowed position to a first deployed position, and which comprises first and second ends, wherein said first end of said first inflatable member is interconnected with said spacecraft body, wherein said second end of said first inflatable member is disposed in spaced relation to said spacecraft body when said first inflatable member is in said first deployed position, wherein said first inflatable member comprises a first cap, wherein said first cap is a rigid support structure, and wherein said first pulsed plasma thruster is attached to said first cap of said first inflatable member, and wherein said first cap of said inflatable member is disposed at least substantially at said second end of said first inflatable member.

15. A spacecraft, comprising:

a spacecraft body;

a first pulsed plasma thruster;

a first inflatable member which is interconnected with said spacecraft body, which is movable at least from a first stowed position to a first deployed position, and which comprises first and second ends, wherein said first end of said first inflatable member is interconnected with said spacecraft body, wherein said second and of said first inflatable member is disposed in spaced relation to said spacecraft body when said first inflatable member is in said first deployed position, wherein said first inflatable member comprises a first cap, wherein said first cap is a rigid support structure, and wherein said first pulsed plasma thruster is attached to said first cap of said first inflatable member; and a second inflatable member which is interconnected with said spacecraft body, which is movable at least from stowed position to a second deployed position, and which comprises first and second ends, wherein said first end of said second inflatable member is interconnected with said spacecraft body, wherein said second end of said second inflatable member is disposed in spaced relation to said spacecraft body when said second inflatable member is in said second deployed position, wherein said second inflatable member comprises a second cap, wherein said second cap is a rigid support structure, and wherein said spacecraft further comprises a second pulsed plasma thruster which is interconnected with said second cap of said second inflatable member.

16. A spacecraft, as claimed in claim 15, further comprising:

a membrane which is interconnected with each of said first and second inflatable members and which is disposed in spaced relation to said spacecraft body when said first and second inflatable members are disposed in said first and second deployed positions, respectively.

17. A spacecraft, as claimed in claim 16, wherein:

said membrane has a surface area of at least about 2,500 m².

18. A spacecraft, comprising:

a spacecraft body;

a first pulsed plasma thruster; and a first inflatable member which is interconnected with said spacecraft body, which is movable at least from a first stowed position to a first deployed position, and which comprises first and second ends, wherein said first end of said first inflatable member is interconnected with said spacecraft body, wherein said second end of said first inflatable member is disposed in spaced relation to said spacecraft body when said first inflatable member is in said first deployed position, wherein said first inflatable member comprises a first cap, wherein said first cap is a rigid support structure, and wherein said first pulsed plasma thruster is attached to said first cap of said first inflatable member, and wherein said first inflatable member is defined by a first flexible material, and wherein said first flexible material is wrapped around said first cap when said first inflatable member is in said first stowed position.

19. A spacecraft, comprising:

a spacecraft body;

a first pulsed plasma thruster;

a first inflatable member which is interconnected with said spacecraft body, which is movable at least from a first stowed position to a first deployed position, and which comprises first and second ends, wherein said first end of said first inflatable member is interconnected with said spacecraft body, wherein said second end of said first inflatable member is disposed in spaced relation to said spacecraft body when said first inflatable member is in said first deployed position, wherein said first inflatable member comprises a first cap, wherein said first cap is a rigid support structure, and wherein said first pulsed plasma thruster is attached to said first cap of said first inflatable member;

a spacecraft bus disposed at said spacecraft body;

a flexible circuit which is electrically interconnected with said spacecraft bus and which extends along said first inflatable member;

a first high voltage power supply which is disposed at said first cap of said first inflatable member and which is electrically interconnected with said flexible circuit;

a first high voltage storage capacitor which is disposed at said first cap and which is electrically interconnected with said first high voltage power supply;

a first pulsed plasma thruster controller which is disposed at said first cap and which is electrically interconnected with said first high voltage storage capacitor, wherein said first pulsed plasma thruster is electrically interconnected with said first pulsed plasma thruster controller, wherein said first high voltage power supply, said first high voltage storage capacitor, said first pulsed plasma thruster controller, and said first pulsed plasma thruster are connected in series;

a second pulsed plasma thruster which is disposed at said first cap;

a second high voltage power supply which is disposed at said first cap of said first inflatable member and which is electrically interconnected with said flexible circuit;

a second high voltage storage capacitor which is diposed at said first cap and which is electrically interconnected with said second high voltage power supply; and a second pulsed plasma thruster controller which is disposed at said first cap and which is electrically interconnected with said second high voltage storage capacitor, wherein said second pulsed plasma thruster is electrically interconnected with said second pulsed plasma thruster controller, wherein said second high voltage power supply, said second high voltage storage capacitor, said second pulsed plasma thruster controller, and said second pulsed plasma thruster are connected in series.

20. A spacecraft, comprising:

a spacecraft body;

a first pulsed plasma thruster;

a first inflatable member which is interconnected with spacecraft body, which is movable at least from a first stowed position to a first deployed position, and which comprises first and second ends, wherein said first end of said first inflatable member is interconnected with said spacecraft body, wherein said second end of said first inflatable member is disposed in spaced relation to said spacecraft body when said first inflatable member is in said first deployed position, wherein said first inflatable member comprises a first cap, wherein said first cap is a rigid support structure, and wherein said first pulsed plasma thruster is attached to said first cap of said first inflatable member;

a spacecraft bus disposed at said spacecraft body;

a high voltage power supply which is disposed at spacecraft body;

a flexible circuit which is electrically interconnected with said high voltage power supply and which extends along said first inflatable member;

a first high voltage storage capacitor which is disposed at said first cap and which is electrically interconnected with said flexible circuit; and a first pulsed plasma thruster controller which is disposed at said first cap and which is electrically interconnected with said first high voltage storage capacitor, wherein said first pulsed plasma thruster is electrically interconnected with said first pulsed plasma thruster controller, wherein said high voltage power supply, said first high voltage storage capacitor, said first pulsed plasma thruster controller, and said first pulsed plasma thruster are connected in series and in this order.

21. A spacecraft, comprising:

a spacecraft body;

a first pulsed plasma thruster;

a first inflatable member which is interconnected with said spacecraft body, which is movable at least from a first stowed position to a first deployed position, and which comprises first and second ends, wherein said first end of said first inflatable member is interconnected with said spacecraft body, wherein said second end of said first inflatable member is disposed in spaced relation to said spacecraft body when said first inflatable member is in said first deployed position, wherein said first inflatable member comprises a first cap, wherein said first cap is a rigid support structure, and wherein said first pulsed plasma thruster is attached to said first cap of said first inflatable member;

a spacecraft bus disposed at said spacecraft body;

a flexible circuit which is electrically interconnect with said spacecraft bus and which extends along said first inflatable member;

a low voltage storage device which is disposed at said first cap of said first inflatable member and which is electrically interconnected with said flexible circuit;

a first high voltage power supply which is disposed at said first cap of said first inflatable member and which is electrically interconnected with said low voltage storage device;

a first high voltage storage capacitor which is disposed at said first cap and which is electrically interconnected with said first high voltage power supply;

a first pulsed plasma thruster controller which is disposed at said first cap and which is electrically interconnected with said first high voltage storage capacitor, wherein said first pulsed plasma thruster is electrically interconnected with said first pulsed plasma thruster controller, wherein said first high voltage power supply, said first high voltage storage capacitor, said first pulsed plasma thruster controller, and said first pulsed plasma thruster are connected in series;

a second pulsed plasma thruster which is disposed at said first cap;

a second high voltage power supply which is disposed at said first cap of said first inflatable member and which is electrically interconnected with said low voltage storage device;

a second high voltage storage capacitor which is disposed at said first cap and which is electrically interconnected with said second high voltage power supply; and a second pulsed plasma thruster controller which is disposed at said first cap and which is electrically interconnected with said second high voltage storage capacitor, wherein said second pulsed plasma thruster is electrically interconnected with said second pulsed plasma thruster controller, wherein said second high voltage power supply, said second high voltage storage capacitor, said second pulsed plasma thruster controller, and said second pulsed plasma thruster are connected in series.

* * * * *